3,817,775
GLASS FIBER REINFORCED ELASTOMERS
Thomas A. Coakley and James C. Sullivan, Newark, Ohio, assignors to Owens-Corning Fiberglas Corporation
No Drawing. Filed Dec. 4, 1972, Ser. No. 312,161
Int. Cl. C08f 45/52; C03c 25/02
U.S. Cl. 117—72                     23 Claims

ABSTRACT OF THE DISCLOSURE

A composition for use in the treatment of glass fibers in the form of an aqueous dispersion having solids comprising a resorcinol aldehyde resin, a butadiene-styrene copolymer, a vinyl pyridine terpolymer and a wax and a source of an aldehyde in an amount sufficient to provide a molar ratio of the total aldehyde to resorcinol within the range of 0.60 to 0.95, and glass fibers treated therewith.

---

This invention relates to glass fiber-elastomeric products, and more particularly to the treatment of glass fibers and compositions in the treatment of glass to facilitate the combination of glass fibers with elastomeric materials such as the manufacture of glass fiber-reinforced elastomeric products.

The term "glass fibers," as used herein, is intended to refer to and include (1) continuous fibers formed by the rapid attenuation of hundreds of streams of molten glass and to strands formed when such continuous glass fiber filaments are gathered together in forming; and to yarns and cords formed by plying and/or twisting a number of strands together, and to woven and non-woven fabrics which are formed of such glass fiber strands, yarns or cords, and (2) discontinuous fibers formed by high pressure steam or air or other attenuating force directed angularly downwardly onto multiple streams of molten glass issuing from a glass melting bushing and to yarns that are formed when such discontinuous fibers are allowed to rain down gravitationally onto a foraminous surface wherein the fibers are gathered together to form a sliver which is drafted into a yarn; and to woven and non-woven fabrics formed of such yarns of discontinuous fibers, and (3) combinations of such continuous and discontinuous fibers in strands, yarns, cords and fabrics formed thereof.

As used herein, the term "elastomer" is intended to mean and include natural rubber in the cured or uncured stage, vulcanized or unvulcanized stage, and synthetic organic elastomeric materials such as nitriles, acrylics and esters and particularly copolymers of butadiene with these and terpolymers thereof with styrene and synthetic rubbers are represented by butadiene polymers and copolymers with monoolefins such as butadiene-styrene copolymer, butadiene-acrylonitrile copolymers, butadiene-styrene vinyl pyridine terpolymers, chloroprene, isoprene, neoprene, isobutyl rubber and the like elastomeric polymers and copolymers in their cured or uncured stages, and vulcanized or unvulcanized stages. Included also are the EPDM rubbers, such as formed by the interpolymerization of ethylene, an alpha-monoolefin having from 3–20 carbon atoms, such as propylene, and a polyene, such as dicyclopentadiene, 1,4-hexadiene and preferably an alkylene or alkylidene norbornene, such as 5-alkylidene-2-norbornene and the like in which the alkylidene group numbers from 2–12 carbon atoms, and polysulfone rubbers.

It is now well known to combine glass fibers with elastomeric materials in the manufacture of glass fiber-reinforced elastomeric products, such as driving belts, timing belts, pneumatic tires, etc. One of the problems which has been encountered in such combinations of glass fibers with elastomeric products is the problem of securely anchoring the glass fiber surfaces to the elastomeric material in which the glass fibers are distributed. It is believed that this problem stems in part from the fact that the glass fibers are completely smooth, rod-like members and in part from the fact that the glass fiber surfaces are highly hydrophilic in nature thereby resulting in the formation of a thin but tenacious film of moisture on the glass fiber surfaces which serves to destroy any bond, chemical or physical, which would otherwise be formed between the glass fiber surfaces and the elastomeric material with which the glass fibers are combined.

To minimize the problems of binding the glass fiber surfaces to the elastomeric materials, it has been the practice in the manufacture of glass fiber-reinforced elastomeric products to make use of glass fibers in the form of individual glass fibers having a coating on the surfaces thereof to intertie the individual glass fibers to the elastomeric material in which the glass fibers are distributed, or preferably glass fibers in the form of yarns, cords or fabrics, hereinafter referred to as bundles, containing an impregnant therein which also serves to intertie the glass fiber bundles to the elastomeric material in which the bundles are distributed.

One such composition which can be used in the treatment of individual glass fibers or bundles of glass fibers as outlined above is described in U.S. Pat. No. 3,567,671 in which description is made of a treating composition formulated to include a resorcinol-aldehyde resin, a butadiene-styrene-vinyl pyridine terpolymer, a latex component and an incompatible wax. As the latex component, use can be made of copolymers of vinyl chloride and vinylidene chloride, an acrylic resin latex in the form of a polymethylmethylacrylate latex or a carboxylated butadiene-styrene resin latex.

In the formulation of impregnating compositions of the type described above which contain a resorcinol-aldehyde resin component and one or more elastomers, it is generally the practice to formulate the composition to include formaldehyde which is believed to react during drying or cure of the treated glass fibers, with the resorcinol-aldehyde resin component of the impregnant to form a cross-linked resorcinol-aldehyde resin. However, research has revealed that the use of formaldehyde (or other lower aliphatic aldehydes) in such impregnating compositions is disadvantageous in that the formaldehyde reacts too rapidly with resorcinol-aldehyde resin component with the result that the impregnated bundle contains a thin skin of a higher molecular weight resorcinol-aldehyde resin. This skin results in a blistered coating on the bundle after curing.

One solution to the problem of blistering, as shown by the foregoing patent, has been to employ an excess of ammonia usually in the form of ammonium hydroxide, in the impregnating composition. It is generally believed that the ammonia serves to slow the reaction between the formaldehyde and the resorcinol-aldehyde resin and thereby prevent or substantially minimize the tendency of the resorcinol-aldehyde resin to form a skin over the impregnated bundle.

However, the use of ammonia, while the ammonia serves to prevent blistering in the impregnated bundle after curing, is not completely satisfactory in some applications. One significant problem which stems from the use of relatively large quantities of ammonia is the irritant characteristics of the impregnating composition, and thus the impregnating composition can be a hazard to plant personnel.

It is accordingly an object of the present invention to provide a composition and method for the treatment of individual glass fibers and bundles of glass fibers in which the use of ammonia can be completely avoided to produce treated glass fibers free from blistering and having improved adhesion when combined with elastomeric materials in the manufacture of glass fiber reinforced elastomeric products.

It is a specific object of this invention to provide a composition and method for the treatment of glass fibers in which the amount of aldehyde employed in the composition to cross-link a resorcinol-aldehyde resin component is carefully controlled to obviate the necessity to employ ammonia in the composition to retard the reaction.

It is another specific object of the invention to provide a composition and method for the treatment of glass fibers in which the rate of the aldehyde reaction to cross-link a resorcinol-aldehyde resin component is controlled through the use of a slow-release aldehyde component.

The concepts of the present invention reside in the discovery that the use of ammonia in impregnating compositions formulated to contain an elastomer component and a resorcinol aldehyde resin component can be avoided without blistering in the cured product where the rate of aldehyde cross-linking of the resorcinol-aldehyde resin component is controlled by the use of low amounts of aldehyde and/or the use of slow-release aldehyde components in the impregnating composition.

In accordance with one preferred embodiment of the invention, an impregnating composition for use in the treatment of glass fibers is formulated to include an elastomer component and a resorcinol-aldehyde resin component, in the absence of ammonia and with the total molar ratio of the aldehyde to the resorcinol being less than 0.95 and preferably less than 0.8. As used herein, the term total molar ratio of the aldehyde to resorcinol is intended to refer to the total of the aldehyde contained in the solids of the resorcinol-aldehyde resin plus the aldehyde added to cross-link the resorcinol-aldehyde resin.

It is completely unexpected that such amounts of aldehyde in the composition would be sufficient to provide a cured coating or impregnant on glass fibers having acceptable adhesion characteristics with elastomers in the absence of ammonia since the art has generally believed that a total molar ratio of aldehyde to resorcinol of at least 0.85 or higher is required to provide a cured impregnant or coating which is capable of providing the desired adhesion between, for example, an impregnated bundle of glass fibers and an elastomeric material in the manufacture of glass fiber reinforced elastomeric products. As is illustrated in U.S. Pat. No. 3,567,671, a resorcinol-formaldehyde resin prepared by reaction of two moles of resorcinol per mole of formaldehyde is used in an amount of 36 parts by weight in combination with 5.92 parts by weight of formaldehyde. Thus, the solids of the resin contain about 0.277 moles of resorcinol and about 0.235 moles of formaldehyde, to porvide a total formaldehyde to resorcinol mole ratio of about 0.85, with ammonia present.

With the system of this invention, the use of ammonia can be avoided to provide a composition for use in the treatment of glass fibers which is capable of providing improved adhesion to elastomeric materials where the total molar ratio of aldehyde to resorcinol is less than 1.0 as described.

The system of this invention is preferably formulated to include a resorcinol-aldehyde resin, a vinyl pyridine-butadiene-styrene terpolymer, a dicarboxylated butadiene-styrene copolymer, microcrystalline paraffin wax and a lower aliphatic aldehyde such as formaldehyde, acetaldehyde or propionaldehyde, with the latter serving to cross-link the resorcinol-aldehyde resin component of the composition.

The resorcinol-aldehyde resin component of the composition of this invention contributes materially to the adhesion of the resulting composition to the perfectly smooth, non-porous hydrophilic glass fiber surfaces, and is preferably a resin formed by reaction of the resorcinol with a lower aliphatic aldehyde containing 1–3 carbon atoms, such as formaldehyde, acetaldehyde and propionaldehyde. Preferred resins for use in the present invention are resorcinol-formaldehyde resins which are formed by the condensation reaction of formaldehyde with resorcinol in a mole ratio of about 2 to 8 moles of resorcinol to 1 mole of formaldehyde. Suitable resins are commercially available such as, for example, Penacolite R2170 from the Koppers Company in the form of a solution containing 75% solids in which the mole ratio of the resorcinol to formaldehyde is about 2:1. In general, use is preferably made of an amount of resorcinol-aldehyde resin to provide resorcinol-formaldehyde resin solids within the range of 2–10 parts by weight, and preferably within the range of 3–8 parts by weight.

As the butadiene-styrene vinyl pyridine terpolymer, use can be made of a number of such terpolymers which are well known to those skilled in the art. Such terpolymers frequently contain about 70% by weight butadiene, 15% by weight styrene and about 15% by weight vinyl pyridine, although these proportions can be varied and are not critical to the practice of this invention. Representative of suitable butadiene-styrene vinyl pyridine terpolymers include the terpolymers available from the Goodyear Tire and Rubber Company under the trade name "Pliolite VP100" and a number of terpolymers available from the General Tire and Chemical Company under the trade name "Gentac". For example, use is preferably made of "Gentac FS" which is a terpolymer having a comparatively low Mooney viscosity within the range of 35–45, although use can also be made of "Gentac 107" which is a terpolymer having a higher Mooney viscosity, generally within the range of 110–120. It has been found that generally superior results have been obtained with the use of Gentac FS since the lower Mooney viscosity of the material contributes improved adhesion characteristics of the resulting treated glass fibers.

One vinyl pyridine - butadiene - styrene terepolymer which is particularly well suited for use in the composition of this invention is a terpolymer marketed by the Goodyear Tire and Rubber Company under the product designation "LPF45451." This particular latex system contains about the same relative amounts of vinyl pyridine, butadiene and styrene, but contains less emulsifier, usually less than 2% by weight. It is believed that the low emulsifier content of this terpolymer contributes to the stability of the overall treating composition.

The terpolymer component is generally employed in an amount sufficient to provide from 20–60 parts by weight, and preferably 25–40 parts by weight, of the terpolymer in the treating composition on a dry solids basis.

As used herein, the term "dicarboxylated butadiene-styrene copolymers" refers to butadiene-styrene copolymers prepared by copolymerization of butadiene and styrene in the presence of a small amount of a dicarboxylic acid containing ethylenic unsaturation. The ratio of styrene to butadiene is at least 50/50, and is preferably within the range of 50/50 to 85/15. Such copolymers are commercially available in the form of latices from the Chemical Division of the Goodyear Tire and Rubber Co. in Akron, Ohio, under the trade names Pliolite 4000, Pliolite 4264, Pliolite 4121, Pliolite 4303, Pliolite 386, Pliolite 402 and Pliolite 388. For a further description of such systems, reference can be made to copending application Ser. No. 230,723 filed Apr. 24, 1972.

The dicarboxylated butadiene-styrene resin preferably constitutes from 10 to 40 parts by weight, and preferably 20 to 30 parts by weight, on a dry solid basis, of the composition of the invention.

The butadiene-styrene-vinyl pyridine terpolymer, the dicarboxylated butadiene-styrene and the resorcinol-formaldehyde resin are all compatible, each with the other, and operate to coat the fibers and fill the interstices between the fibers when applied as an impregnant in a glass fiber bundle whereby the fibers making up the bundle are capable of realignment in the direction of stress for maximizing the high strength properties of the impregnated bundle. These components are also somewhat compatible with the elastomeric materials forming the continuous phase of a glass fiber-elastomeric product to thereby permit glass fibers treated in accordance with the present invention to be blended with such elastomeric materials for advancement to a cured or vulcanized stage whereby the treating material from the glass fiber bundles becomes an integral part of the elastomeric phase to intertie the treated glass fibers to the elastomeric material.

The incompatible wax component of the present invention is preferably a micro-crystalline paraffinic wax of the type described in the forementioned patent, and without limiting the present invention as to theory, it is believed that the wax serves at least a limited function as a rubber softener. The wax is normally employed in an amount in excess of that capable of remaining compatible with the solids makeup of the remainder of the treating composition whereby the wax component sweats out for concentration on the surfaces of the treated glass fibers or glass fiber bundles to provide a non-tacky surface and thereby permit treated glass fibers to be processed into yarns, threads, cords or fabrics, and/or to be wound onto and unwound from spools without sizure or binding, notwithstanding the elastomeric component with which the fibers are treated. Thus, the glass fibers can be treated with a composition that enhances good adhesion to the surfaces of glass fibers without interfering with the subsequent processing characteristics of the glass fibers. The composition also contained the necessary components to facilitate the bonding relationship between the glass fiber surfaces and the elastomeric material in the manufacture of glass fiber-reinforced elastomeric products.

The wax preferred for use in the present invention is a micro-crystalline paraffinic wax having a melting point within the range of 145–150° F. and sold under the designation "Vultex Wax Emulsion No. 5" by the General Latex and Chemical Corp. As will be appreciated by those skilled in the art, other paraffinic micro-crystalline waxes having the described characteristics can be employed in the practice of this invention in lieu of or in addition to the Vultex wax specifically described. The amount of the wax component can be varied within the range of 3 to 25 parts by weight, and preferably 4 to 20 parts by weight, of the dry solids of the treating composition.

As indicated above, the composition of this invention is also formulated to include an aldehyde but not the conventional ammonia component. As will be appreciated by those skilled in the art, the amount of aldehyde which is added to the composition depends upon the mole ratio of the aldehyde to resorcinol in the resorcinol-aldehyde resin. It is generally preferred that the total mole ratio of aldehyde to resorcinol be within the range of 0.60 to 0.95, and preferably 0.70 to 0.925, which corresponds to a relatively small addition of aldehyde to the composition. It has been found that good results are usually obtained where the amount of aldehyde added corresponds to 30 to 150% of the aldehyde contained in the resorcinol-aldehyde resin component.

In the preparation of the composition of this invention, the method of mixing the components is important to provide a composition which is stable over long periods of time without gellation. In the preferred practice of the invention, the carboxylated butadiene-styrene copolymers and the wax emulsion are just blended together, and then a pre-mix of the resorcinol-aldehyde latex with water is mixed with the resulting mixture of the butadiene-styrene copolymer and wax. Next, the vinyl pyridine-butadiene-styrene terpolymer is blended with the resulting mixture, and an aqueous solution of the aldehyde is added last to the final mixture. However, where it is contemplated that the composition of the invention will be employed in the treatment of glass fibers shortly after formulation of the composition, variations in the foregoing procedure can be followed as desired.

The amount of water employed in the formulation of the composition of this invention can be varied within wide limits, depending upon the solids content desired in the composition. It has been found that best results are usually achieved where the water employed is an amount sufficient to provide a solids content within the range of 10 to 50% by weight, and preferably 25 to 47% by weight.

In accordance with another embodiment of the invention, control of the cross-linking of the resorcinol-aldehyde resin component of the composition can be achieved by formulating the composition to include a slow release aldehyde component, and preferably a slow release formaldehyde generator. Such components are well known to those skilled in the art as shown in U.S. Pat. No. 3,522,127 and include hexamethylene tetramine, paraformaldehyde, trioxymethylene and alkyl ethers of hexamethylol melamine (*e.g.*, hexamethoxymethyl melamine, hexaethoxymethyl melamine, etc.) and others. Hexamethylene tetramine is usually preferred.

The aldehyde release component is formulated in the composition in lieu of or in combination with an aldehyde. Where the aldehyde release component is employed alone without separate aldehyde present, the amount of the aldehyde release component can be varied within wide limits. In general, use can be made of an amount sufficient to theoretically release aldehyde in an amount to provide a total mole ratio of aldehyde to resorcinol of 0.60 to 1.3 or higher and preferably 0.60 to 0.95. Where the aldehyde release component is employed in addition to separate aldehyde, it is preferred that at least 40% of the aldehyde added be present in combined form as the slow release aldehyde component.

Having described the basic concepts of this invention, reference is now made to the following examples, which are provided by way of illustration and not by way of limitation, of the practice of this invention in treating glass fibers for subsequent combination with elastomeric materials in the manufacture of glass fiber-reinforced elastomeric products. In the preferred practice of the invention, a glass fiber bundle, in the form of one or more strands of fibers or in the form of a cord composed of two or more strands of glass fibers plied and/or twisted together, is subjected to impregnation with composition of the invention. The glass fibers forming the bundle preferably have a thin size coating on the individual surfaces of the fibers from a conventional size composition such as one of those size compositions described in U.S. Pat. No. 3,424,608.

An impregnating composition representative of the concepts of the invention is prepared from the following:

EXAMPLE 1

Part A: Parts by wt.
    Deionized water _____ 95
    Resorcinol-formaldehyde polymer in the form of a latex containing 75% solids (Penacolite R2170) _____ 105

Part B:
    Butadiene - styrene - vinyl pyridine terpolymer (42% solids) (LPF 4545 _____ 805

Part C:
    Dicarboxylated butadiene - styrene copolymer (50% solids) (LPR 4303) _____ 230
    Micro-crystalline paraffin wax (melting point 145–150° F.), Vultex Wax Emulsion No. 5 of General Latex and Chemical Corp. (55% solids) _____ 100

Part D:
    Deionized water _____ 20.5
    Formalin (37% formaldehyde) _____ 11.8

Part A of the composition is separately prepared and then is mixed with part C, and part B of the composition is blended with the resulting mixture. Thereafter, part D is slowly added to the resulting mixture at a rate sufficiently low to prevent precipitation of the latex components.

The resulting composition has a solids content of about 43% by weight and a pH of 8.0 to 9.0.

Impregnation with the aqueous composition prepared in accordance with Example 1 can be carried out by way of any of a number of known techniques for use in the impregnation of glass fiber bundles. It is preferred to utilize the immersion technique described and illustrated in U.S. Pat. No. 3,424,608 in which a bundle of sized or unsized glass fibers are immersed in a bath of the composition and subjected to a sharp bend which serves to open the bundle and permit the solids of the impregnant to penetrate the bundle to fill the interstices between the glass fiber filaments and separate the fibers each from the other to provide maximum protection of the fibers from destruction through mutual abrasion.

Following impregnation, the bundles of treated glass fibers are dried at an elevated temperature, usually within the range of 100 to 400° F. to accelerate removal of the aqueous diluent and to set the impregnant *in situ* and thereby crosslink the resorcinol-aldehyde resin.

Additional examples of this concept of the present invention may be illustrate by the following:

EXAMPLE 2

Part A:                                 Parts by wt.
    Deionized water _____ 50
    Resorcinol-formaldehyde resin (75% solids) __ 100
Part B:
    Vinyl pyridine - butadiene - styrene terpolymer
       (42% solids) (Gentac FS) _____ 835
Part C:
    Dicarboxylated butadiene - styrene copolymer
       (50% solids) _____ 430
    Vultex Wax Emulsion No. 5 (55% solids) ____ 100
Part D:
    Deionized water _____ 20
    Formalin _____ 11.5

EXAMPLE 3

Part A:                                 Parts by wt.
    Deionized water _____ 73
    Resorcinol-formaldehyde latex (75% solids) __ 100
Part B:
    Butadiene - styrene - vinyl pyridine terpolymer
       (Gentac 107–42% solids) _____ 900
Part C:
    Dicarboxylated butadiene - styrene copolymer
       (50% solids) _____ 420
    Vultex Wax Emulsion No. 5 (55% solids) ____ 100
Part D:
    Deionized water _____ 300
    Hexamethylene tetramine _____ 640

EXAMPLE 4

Part A:                                 Parts by wt.
    Deionized water _____ 73
    Resorcinol-formaldehyde latex (75% solids) __ 100
Part B:
    Butadiene - styrene - vinyl pyridine terpolymer
       (Gentac 107–42% solids) _____ 900
Part C:
    Dicarboxylated butadiene - styrene copolymer
       (50% solids) _____ 420
    Vultex Wax Emulsion No. 5 (55% solids) ____ 100
Part D:
    Deionized water _____ 300
    Hexamethylene tetramine _____ 172

The foregoing compositions are prepared in accordance with the procedure described in Example 1, and the resulting compositions can be applied by impregnation to glass fiber bundles in accordance with the procedure described in Example 1. In general, the impregnating compositions used in the practice of this invention are diluted with sufficient water to provide a composition having a solids content within the range of 10–50% by weight. Application of the impregnating composition can be made in an amount sufficient to impregnate with dry solids of 5–30% by weight of the glass fiber bundle, and preferably 10–25% by weight.

It is desirable to achieve as full impregnation as possible into the bundles of glass fibers to more effectively separate the fibers each from the other with the impregnating material since the solids are effective to cushion the fibers and to protect the fibers from destruction by mutual abrasion. The deeper the penetration, the more effective is the bond between the bundles of glass fibers and the elastomeric material with which the bundles of glass fibers are combined in the subsequent manufacture of glass fiber-elastomeric products.

The elastomeric material with which the impregnated bundle of glass fibers is combined constitutes a continuous phase. The elastomer constituting the continuous phase may be selected from elastomers of the type incorporated into the impregnating composition, or the elastomeric material may differ therefrom. The elastomer constituting a continuous phase can be employed in the cured or uncured stage or in the vulcanized or unvulcanized stage. It is believed that the tie-in between the impregnated bundle of glass fibers and the elastomer constituting the continuous phase occurs primarily during cure or vulcanization of the elastomeric materials in combination with the impregnated bundles.

While the compositions of Examples 1 to 4 have been described above as impregnating compositions for use in the treatment of bundles of glass fibers, it will be understood by those skilled in the art that the compositions of the invention can also be used, preferably with greater dilution with water, in the treatment of individual glass fiber filaments to form a thin coating on the individual surfaces thereof. For this purpose the compositions of the invention are preferably formulated to include a glass fiber anchoring agent in the form of an organo silicon compound such as gamma-aminopropyltriethoxy silane. Such anchoring agents are *per se* well known to the art, and provide a more secure bonding relationship between the glass fibers and the coating thereon.

In fabricating the combinations of glass fibers, treated in accordance with the practice of this invention, with elastomeric materials, the glass fibers or bundles of glass fibers are mixed with the elastomeric material or otherwise laid down in the desired arrangement for combination with the elastomeric material, as in the manufacture of glass fiber-reinforced belts or in the manufacture of rubber tires reinforced with cords of glass fibers. The combinations of glass fibers and elastomeric materials are then processed in a conventional manner by molding and curing under heat and pressure or by vulcanizing for advancement of the elastomeric materials to a cured or vulcanized state while in combination with the treated glass fibers whereby the bundles of glass fibers become strongly integrated with the elastomeric material in the glass-fiber-elastomeric product.

It will be apparent from the foregoing that we have provided a new and improved composition for use in the treatment of glass fibers and preferably bundles formed thereof to enhance their utilization with elastomeric materails, in the manufacture of glass fiber-elastomeric products while still retaining the desired degree of non-tackiness to enable the treated glass fiber bundle to be processed in substantially the conventional manner into cords, yarns, or fabrics or other arrangements desired for use in the final product.

It will be understood that invention exists not only in the compositions described but also in the process in which the compositions are employed in the treatment of glass fibers as well as the treated or impregnated glass fiber products formed thereof.

It will be understood that changes may be made in the details of formulation and methods of preparation without departing from the spirit of the invention, especially as defined in the following claims.

We claim:

1. A composition for use in the treatment of glass fibers consisting of an aqueous dispersion having solids comprising 2 to 10 parts by weight of a resorcinol aldehyde resin, 10 to 40 parts by weight of a dicarboxylated butadiene-styrene copolymer, 20 to 60 parts by weight of a terpolymer of vinyl pyridine, butadiene and styrene, 3 to 25 parts by weight of an incompatible microcrystalline paraffin wax and a source of an aldehyde in an amount sufficient to provide a molar ratio of the total of the aldehyde contained in the resin and the source of the aldehyde to the resorcinol within the range of 0.60 to 0.95.

2. A composition as defined in claim 1 wherein the source of aldehyde is an aliphatic aldehyde containing 1 to 3 carbon atoms.

3. A composition as defined in claim 1 wherein the source of aldehyde is a slow release aldehyde generator.

4. A composition as defined in claim 3 wherein the generator is a slow release formaldehyde generator.

5. A composition as defined in claim 3 wherein the source of aldehyde is selected from the group consisting of hexamethylene tetramine, paraformaldehyde, trioxymethylene and lower alkyl ethers of hexamethylol melamine.

6. A composition as defined in claim 1 wherein the molar ratio is within the range of 0.7 to 0.925.

7. A composition as defined in claim 1 wherein the resin contains resorcinol and an aldehyde in a mole ratio of 2 to 8 moles of resorcinol to 1 mole of aldehyde.

8. A composition for use in the treatment of glass fibers consisting of an aqueous dispersion having solids comprising 2 to 10 parts by weight of a resorcinol aldehyde resin, 10 to 40 parts by weight of a dicarboxylated butadiene-styrene copolymer, 20 to 60 parts by weight of a terpolymer of vinyl pyridine, butadiene and styrene, 3 to 25 parts by weight of an incompatible microcrystalline paraffin wax and a source of an aldehyde in an amount sufficient to provide a molar ratio of the total of the aldehyde contained in the resin and the source of the aldehyde to the resorcinol within the range of 0.60 to 0.95, and a slow release aldehyde compound in an amount sufficient to provide a molar ratio of the total of the aldehyde contained in the resin and the aldehyde theoretically releasable from the slow release compound to resorcinol within the range of 0.6 to 0.925.

9. A composition as defined in claim 8 wherein the slow release aldehyde compound is a slow release formaldehyde compound selected from the group consisting of hexamethylene tetramine, paraformaldehyde, trioxymethylene and lower alkyl ethers of hexamethylol melamine.

10. A composition as defined in claim 8 wherein the resin contains resorcinol and an aldehyde in a mole ratio of 2 to 8 moles of resorcinol to 1 mole of aldehyde.

11. A method for preparing the composition defined in claim 1 comprising the steps of mixing a latex of the butadiene styrene copolymer with an emulsion of the wax, adding the resin to the resulting mixture and sequentially adding the terpolymer and the source of aldehyde in aqueous solution.

12. Glass fibers having a coating thereon, said coating containing 2 to 10 parts by weight of a resorcinol aldehyde resin, 10 to 40 parts by weight of a dicarboxylated butadiene-styrene copolymer, 20 to 60 parts by weight of a terpolymer of vinyl pyridine, butadiene and styrene, and 3 to 25 parts by weight of an incompatible microcrystalline paraffin wax, with the resin being cross linked by a lower aliphatic aldehyde in an amount sufficient to provide a molar ratio of the total of the aldehyde in the resin and the lower aliphatic aldehyde to the resorcinol present in the resin within the range of 0.60 to 0.95 and with the cross-linking of the resin having taken place in the absence of ammonia.

13. Glass fibers as defined in claim 12 wherein the glass fibers are in the form of a bundle and the coating is an impregnant in the bundle.

14. Glass fibers as defined in claim 13 wherein the bundle is formed of a plurality of strands which have been plied and twisted together.

15. Glass fibers as defined in claim 12 wherein the molar ratio is within the range of 0.70 to 0.925.

16. Glass fibers as defined in claim 12 wherein the resin contains resorcinol and an aldehyde in a mole ratio of 2 to 8 moles of resorcinol per mole of aldehyde.

17. Glass fibers as defined in claim 13 wherein the bundle is in the form of a cord.

18. Glass fibers as defined in claim 13 wherein the individual glass fibers forming the bundle have a thin size coating on the surfaces thereof.

19. In a glass fiber reinforced elastomeric product in which an elastomeric material constitutes a continuous phase in which the glass fibers are distributed, the improvement in the bonding relationship between the glass fibers and the elastomeric material comprising a coating on the glass fibers containing 2 to 10 parts by weight of a resorcinol-aldehyde resin, 10 to 40 parts by weight of a dicarboxylated butadiene-styrene copolymer, 20 to 60 parts by weight of a terpolymer of vinyl pyridine, butadiene and styrene, and 3 to 25 parts by weight of an incompatible microcrystalline paraffin wax, with the resin being cross-linked by a lower aliphatic aldehyde in an amount sufficient to provide a molar ratio of the total of the aldehyde in the resin and the lower aliphatic aldehyde to the resorcinol present in the resin within the range of 0.60 to 0.95 and with the cross-linking of the resin having taken place in the absence of ammonia.

20. A product as defined in claim 19 wherein the glass fibers are in the form of a bundle and the coating is an impregnant in the bundle.

21. A product as defined in claim 20 wherein the individual glass fibers forming the bundle have a thin size coating on the surfaces thereof.

22. Glass fibers having a coating thereon, said coating containing 2 to 10 parts by weight of a resorcinol aldehyde resin, 10 to 40 parts by weight of a dicarboxylated butadiene-styrene copolymer, 20 to 60 parts by weight of a terpolymer of vinyl pyridine, butadiene and styrene and 3 to 25 parts by weight of an incompatible microcrystalline paraffin wax, with the resin being cross linked by a lower aliphatic aldehyde derived from a slow release aldehyde generator in an amount sufficient to provide a molar ratio of the total of the aldehyde in the resin and the lower aliphatic aldehyde to the resorcinol present in the resin within the range of 0.60 to 0.95.

23. Glass fibers as defined in claim 22 wherein the glass fibers are in the form of a bundle and the coating is an impregnant in the bundle.

References Cited
UNITED STATES PATENTS 3,567,671    3/1971    Janetos et al. _____ 260—28.5 B MORRIS LIEBMAN, Primary Examiner S. L. FOX, Assistant Examiner U.S. Cl. X.R.

117—126 GB; 260—28.5 B